(12) United States Patent
Kuwagaki

(10) Patent No.: US 10,612,688 B2
(45) Date of Patent: Apr. 7, 2020

(54) CORROSION PREVENTION APPARATUS AND CORROSION PREVENTION METHOD FOR CUT FACES OF PIPES

(71) Applicant: Waterworks Technology Development Organization Co., Ltd., Osaka-shi (JP)

(72) Inventor: Daisuke Kuwagaki, Osaka (JP)

(73) Assignee: Waterworks Technology Development Organization Co., Ltd., Osaka (JP)

( * ) Notice: Subject to any disclaimer, the term of this patent is extended or adjusted under 35 U.S.C. 154(b) by 331 days.

(21) Appl. No.: 15/565,552

(22) PCT Filed: Apr. 8, 2016

(86) PCT No.: PCT/JP2016/061538
§ 371 (c)(1),
(2) Date: Oct. 10, 2017

(87) PCT Pub. No.: WO2016/163515
PCT Pub. Date: Oct. 13, 2016

(65) Prior Publication Data
US 2018/0119846 A1    May 3, 2018

(30) Foreign Application Priority Data

Apr. 9, 2015    (JP) ................ 2015-080009

(51) Int. Cl.
| F16K 43/00 | (2006.01) |
| F16L 58/18 | (2006.01) |
| F16K 11/085 | (2006.01) |
| F16L 57/00 | (2006.01) |
| F16K 5/04 | (2006.01) |
| F16L 41/06 | (2006.01) |
| F16L 55/105 | (2006.01) |
| F16L 55/124 | (2006.01) |

(52) U.S. Cl.
CPC ............ F16K 43/00 (2013.01); F16K 5/0407 (2013.01); F16K 11/0853 (2013.01);
(Continued)

(58) Field of Classification Search
CPC .... F16K 43/00; F16K 11/0853; F16K 5/0407; F16K 5/04; F16K 5/0442; F16K 5/0492;
(Continued)

(56) References Cited

U.S. PATENT DOCUMENTS

| 587,108 A | * | 7/1897 | Sherrerd | ................ F16K 43/00 |
| | | | | 137/315.41 |
| 3,809,114 A | * | 5/1974 | Mueller | ................ F16K 27/006 |
| | | | | 137/315.25 |

(Continued)

FOREIGN PATENT DOCUMENTS

| JP | 2004-60689 A | 2/2004 |
| JP | 2005-48955 A | 2/2005 |

(Continued)

Primary Examiner — Aaron M Dunwoody
(74) Attorney, Agent, or Firm — Knobbe, Martens, Olson & Bear, LLP

(57) ABSTRACT

An apparatus includes a telescopic double tubular member accommodated in an outer case that is mounted so as to surround an outer circumferential surface of a water pipe, and placed between a pair of cut faces. The double tubular member includes an anti-corrosion member that faces the pair of cut faces and a core member, and is configured such that the anti-corrosion member is radially expanded by the core member, so as to be pressed against the pair of cut faces. The anti-corrosion member has a through hole that communicates with the water pipe, and a flange positioned above the through hole and extending radially outward. The flange has an abutment surface that abuts an outer circumferential surface of the water pipe, and this abutment surface is curved along the outer circumferential surface of the water pipe.

6 Claims, 11 Drawing Sheets

(52) U.S. Cl.
CPC .............. *F16L 57/00* (2013.01); *F16L 58/188* (2013.01); *F16L 41/06* (2013.01); *F16L 55/105* (2013.01); *F16L 55/124* (2013.01)

(58) Field of Classification Search
CPC ......... Y10T 137/0519; Y10T 137/6058; Y10T 137/6062; F16L 29/00; F16L 29/002
USPC ................ 285/15, 31, 18; 251/309–312; 137/15.24, 315.25, 315.26
See application file for complete search history.

(56) References Cited

U.S. PATENT DOCUMENTS

| | | | | |
|---|---|---|---|---|
| 4,410,003 | A * | 10/1983 | Sandling | F16K 5/0271 137/312 |
| 4,617,957 | A * | 10/1986 | Sandling | F16K 5/0271 137/315.13 |
| 5,620,020 | A * | 4/1997 | Collins | F16L 41/06 137/318 |
| 8,613,291 | B2 * | 12/2013 | Heffernan | F16L 41/06 137/317 |
| 2008/0087671 | A1 * | 4/2008 | Kreider | E03B 7/075 220/484 |
| 2015/0338002 | A1 * | 11/2015 | Lashinske | F16M 13/02 285/325 |
| 2016/0230897 | A1 * | 8/2016 | Munetomo | F16K 43/00 |
| 2019/0257433 | A1 * | 8/2019 | Nagamori | F16K 5/0407 |

FOREIGN PATENT DOCUMENTS

| | | |
|---|---|---|
| JP | 2006-112540 A | 4/2006 |
| JP | 2006-112541 A | 4/2006 |
| JP | 2006-194344 A | 7/2006 |
| JP | 2013-185682 | 9/2013 |

* cited by examiner (a)

(c)

(b)

(d)

(a)

(c)

(b)

(d)

CORROSION PREVENTION APPARATUS AND CORROSION PREVENTION METHOD FOR CUT FACES OF PIPES

CROSS-REFERENCE TO RELATED APPLICATIONS

This application is the U.S. National Phase under 35. U.S.C. § 371 of International Application PCT/JP2016/061538, filed Apr. 8, 2016, which claims priority to Japanese Patent Application No. 2015-080009, filed Apr. 9, 2015. The disclosures of the above-described applications are hereby incorporated by reference in their entirety.

TECHNICAL FIELD

The present invention relates to a corrosion prevention apparatus and a corrosion prevention method for preventing corrosion of a pair of cut faces of a fluid pipe formed by making a full cut of the pipe.

BACKGROUND ART

Work of cutting an existing water pipe (an example of a fluid pipe) without stopping the water and changing the flow path or installing a valve device at the cut section is conventionally known. The cutting work here includes drilling or making a hole in the outer circumferential surface of the water pipe, and cutting off the water pipe in the pipe axis direction, i.e., making a full cut. The latter is disclosed in Patent Documents 1 to 5, for example.

It is preferable in such work to cover the end face that is exposed by the cutting to prevent corrosion. In the case with a full cut, it is desirable to provide an anti-corrosion treatment to each of the resultant pair of cut faces of the pipe. This is because exposed cut faces of the pipe will allow generation and entrance of rust in the pipe or penetration of water into the boundary between the inner face of the water pipe and the lining layer thereon, leading to inconveniences.

Patent Documents 1 and 2 disclose a method of preventing corrosion by placing a ring-like sealing member on the pair of cut faces formed by making a full cut of a pipe. This method, however, requires considerably complex devices and processes and can be regarded as impractical method in most cases from the viewpoints of economic efficiency and workability.

Patent Document 6 describes a corrosion prevention apparatus having a telescopic double tubular member. With this apparatus, a core member is inserted into an anti-corrosion member in the form of a C-shaped tube, thereby to enlarge the anti-corrosion member in diameter to be pressed against the pair of cut faces of the pipe. Sometimes, however, the anti-corrosion member was installed at a slant when the double tubular member was placed between the pair of cut faces of the pipe, or the anti-corrosion member was displaced from the pair of cut faces of the pipe because of the load applied when the core member was inserted, or the anti-corrosion member was enlarged in diameter unevenly when the core member was inserted. There was thus a scope of further improvement for providing a correct anti-corrosion treatment.

PRIOR ART DOCUMENTS

Patent Documents

Patent Document 1: JP-A-2006-112540
Patent Document 2: JP-A-2006-112541
Patent Document 3: JP-A-2004-60689
Patent Document 4: JP-A-2005-48955
Patent Document 5: JP-A-2006-194344
Patent Document 6: JP-A-2013-185682

SUMMARY OF THE INVENTION

Problems to be Solved by the Invention

The present invention was made in view of the circumstances described above, and its object is to provide a corrosion prevention apparatus and a corrosion prevention method for cut faces of pipes, whereby a correct anti-corrosion treatment can be provided to cut faces formed by making a full cut of a pipe.

The object can be achieved by the following present invention. The present invention provides a corrosion prevention apparatus for cut faces of pipes, comprising:

a telescopic double tubular member accommodated in an outer case that is mounted such as to surround an outer circumferential surface of a fluid pipe, and placed from above between a pair of cut faces formed by making a full cut of the fluid pipe, the double tubular member including an anti-corrosion member that faces the pair of cut faces of the pipe and a core member to be inserted into the anti-corrosion member from above, and the double tubular member being configured such that the anti-corrosion member expands radially by the core member being inserted into the anti-corrosion member, so as to be pressed against the pair of cut faces of the pipe, the anti-corrosion member having a through hole that communicates with the fluid pipe, and a flange positioned above the through hole and extending radially outward, and the flange having an abutment surface that abuts on an outer circumferential surface of the fluid pipe, the abutment surface being curved along the outer circumferential surface of the fluid pipe.

With this corrosion prevention apparatus, when the double tubular member is set from above between the pair of cut faces formed by making a full cut of the pipe, the abutment surface of the flange of the anti-corrosion member abuts on the outer circumferential surface of the fluid pipe. Since the abutment surface is curved along the outer circumferential surface of the fluid pipe, the anti-corrosion member is prevented from being installed at a slant. The flange above the cut faces of the pipe is placed firmly, so that positional displacement of the anti-corrosion member during insertion of the core member can be prevented. Thus, the anti-corrosion treatment can be provided correctly to the cut faces of the pipe.

It is preferable that the anti-corrosion member comprises an annular cylindrical member that does not have a split portion in a circumferential direction. With this structure, the anti-corrosion member can readily expand radially uniformly by insertion of the core member, so that it is advantageous for pressing the anti-corrosion member correctly against the cut faces of the pipe. The anti-corrosion member hardly comes off of the core member, so that they are easier to handle when the double tubular member is to be recovered.

It is preferable that the anti-corrosion member has an upper engagement portion positioned above the through hole and extending radially inward, while the core member has a radially inwardly recessed lower engagement portion on an outer periphery in a lower part thereof, the double tubular member being able to be held temporarily with a lower part of the core member inserted in the anti-corrosion member by fitting the upper engagement portion of the anti-corrosion member with the lower engagement portion of the core member, and the upper engagement portion of the anti-corrosion member extending in a circumferential direction, with notches formed at a plurality of positions in the circumferential direction.

With this structure that enables such a temporary hold, the double tubular member is easier to handle, so that the workability can be significantly improved. On the other hand, the notches formed in the upper engagement portion of the anti-corrosion member help reduce the resistance when the core member is inserted into the anti-corrosion member so as to allow the insertion of the core member to be made smoothly. As a result, the anti-corrosion member can smoothly expand radially and can be correctly pressed against the cut faces of the pipe.

In the above structure, it is preferable that the notches are shorter at positions opposite the fluid pipe than elsewhere, or, the notches are only formed at positions not opposite the fluid pipe. With this structure, a reduction in the thickness of the anti-corrosion member in the portion where the abutment surface of the flange is provided is minimized. As this increases the stability of the flange placed above the cut faces of the pipe, the anti-corrosion treatment can be performed more correctly.

It is preferable that the anti-corrosion member has a larger number of through holes in sides than that of through holes formed in sides of the core member. In this case, the anti-corrosion member will have redundant through holes that do not communicate with the through holes formed in the core member. Although these redundant through holes are not used for fluid communication, they allow the anti-corrosion member to expand radially more easily, and thus are advantageous in pressing the anti-corrosion member correctly against the cut faces of the pipe.

Further, the present invention provides a corrosion prevention method for cut faces of pipes, comprising:

placing the double tubular member from above between a pair of cut faces formed by making a full cut of the fluid pipe, with the use of the corrosion prevention apparatus for cut faces of pipes according to any one of claims 1 to 5;

bringing an abutment surface of the flange into contact with an outer circumferential surface of the fluid pipe from above;

inserting the core member into the anti-corrosion member that is positioned opposite the pair of cut faces of the pipe; and pressing the anti-corrosion member that has been radially expanded by insertion of the core member against the pair of cut faces of the pipe. With this method, as described above, the anti-corrosion member is prevented from being installed at a slant, and positional displacement of the anti-corrosion member during insertion of the core member is prevented, so that the anti-corrosion treatment can be performed correctly to the cut faces of the pipe.

MODE FOR CARRYING OUT THE INVENTION

An embodiment of the present invention will be explained with reference to the drawings. This embodiment illustrates an example of work carried out to an existing ductile cast iron water pipe (an example of a fluid pipe) to change the flow path at a cut section where the pipe was fully cut off, and to apply an anti-corrosion treatment without stopping the water.

Figure 1:
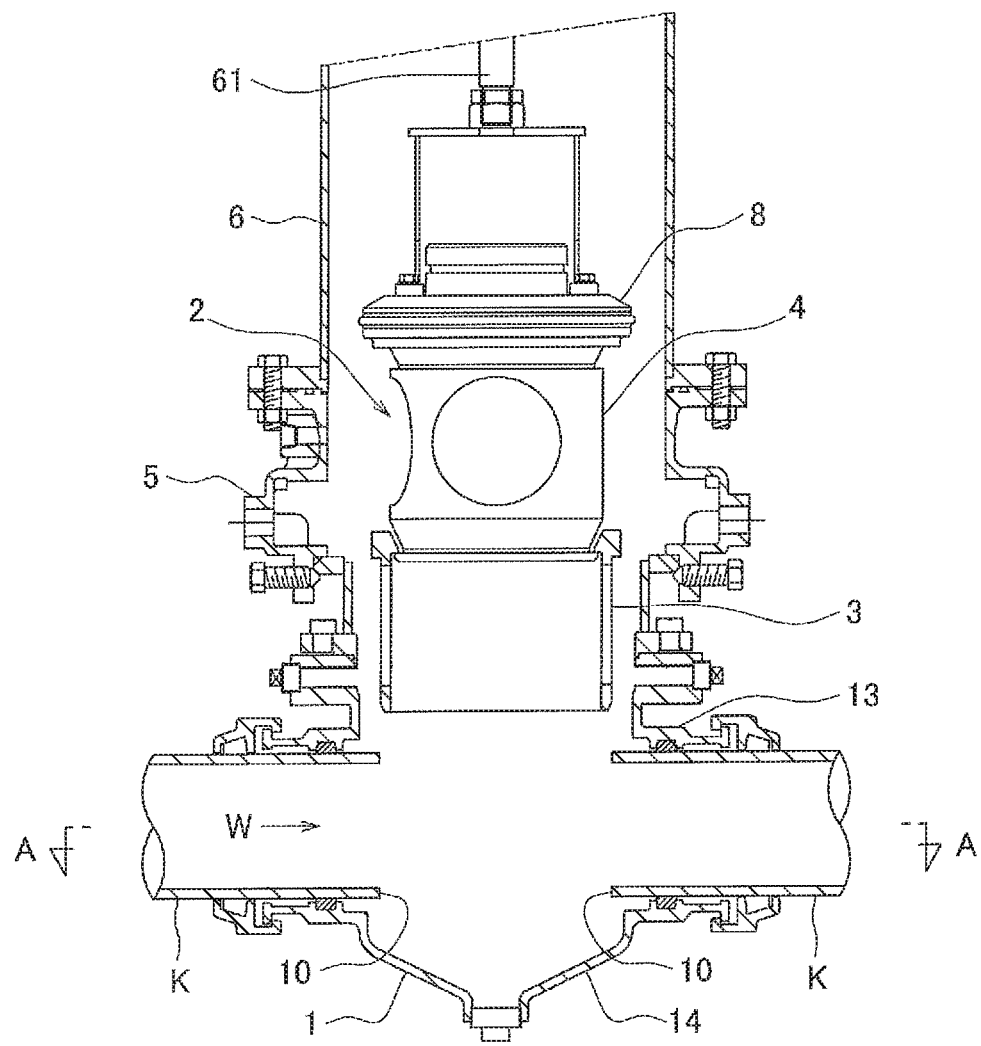
FIG. 1 is a longitudinal cross-sectional front view illustrating how a corrosion prevention apparatus is attached.
Figure 2:
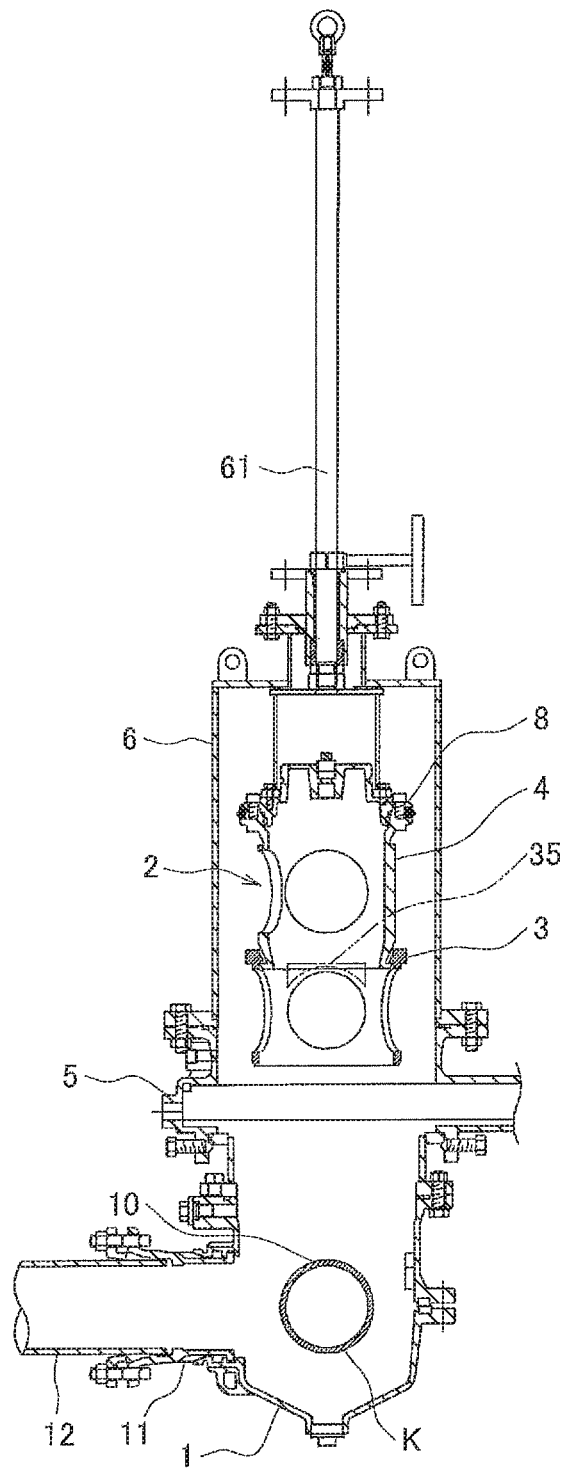
FIG. 2 is a longitudinal cross-sectional side view illustrating how the corrosion prevention apparatus is attached.

The water pipe K shown in FIG. 1 has already been fully cut off and separated in the pipe axis direction. The full cut of the pipe has been made with the use of a drilling machine connected above a sluice valve 5 (hereinafter, work valve 5), and a sealed case 6 is connected to the work valve 5 after the drilling machine has been removed. Arrow W indicates the direction of the water flow inside the water pipe K. FIG. 2 shows a longitudinal cross section viewed from the right side of FIG. 1 in a state before a double tubular member 2 is lowered. Namely, the state of FIG. 1 is reached when the work valve 5 in FIG. 2 is opened and the double tubular member 2 is lowered.

Figure 3:
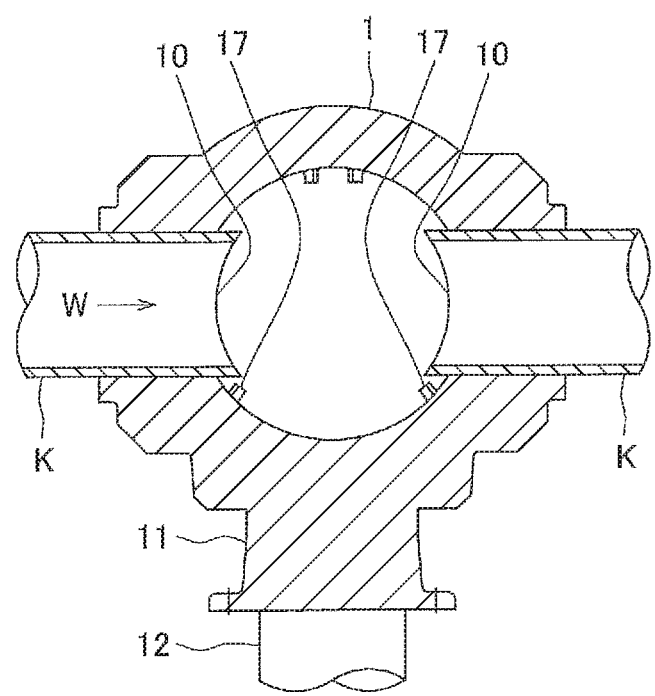
FIG. 3 is a schematic diagram illustrating an A-A cross section of FIG. 1.

This corrosion prevention apparatus includes a telescopic double tubular member 2 to be accommodated in an outer case 1 that is mounted such as to surround the outer circumferential surface of the water pipe K. The outer case 1 has a split structure that can be fitted externally on the existing water pipe K to provide a seal around the cut section where the pipe is fully cut off. The outer case 1 of this embodiment has a T pipe shape as shown in FIG. 3 and a branch pipe 12 that will constitute a secondary pipeline after the flow path has been changed is connected to a branch section 11 extending in a direction intersecting the pipe axis direction of the water pipe K.

The outer case 1 has an upper and lower split structure wherein an upper member 13 and a lower member 14 are joined to each other with fasteners. Instead of fasteners made up of bolts and nuts, they can be joined together by welding or the like. Such a structure of the outer case 1 is disclosed in JP-A-2007-187241 and JP-A-2011-75052, for example. An opening is formed in an upper part of the upper member 13, and the cutter of the drilling machine and the double tubular member 2 are placed inside the outer case 1 through this opening.

Figure 4:
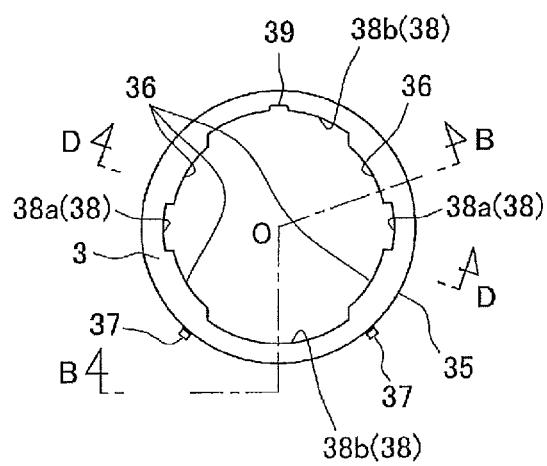
FIG. 4(a) is a plan view.
FIG. 4(b) is a B-O-B half cross-sectional view.
FIG. 4(c) is a C-C cross-sectional view.
FIG. 4(d) is a side view of an anti-corrosion member.
Figure 4:
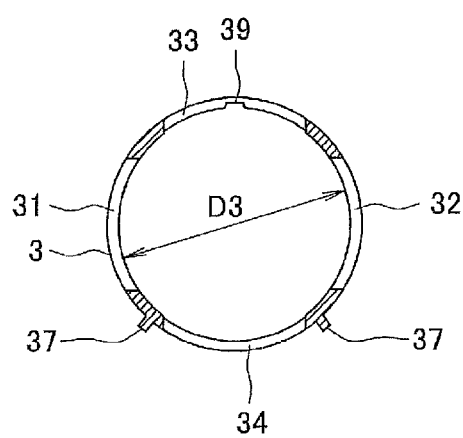
Figure 4:
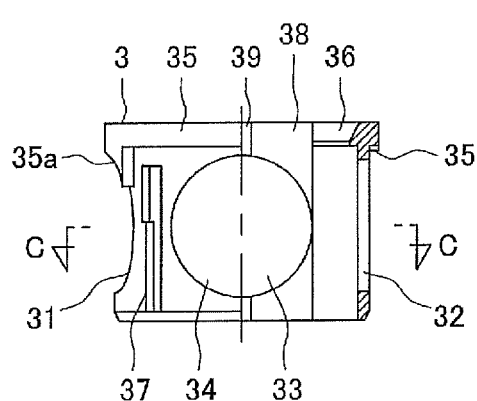
Figure 4:
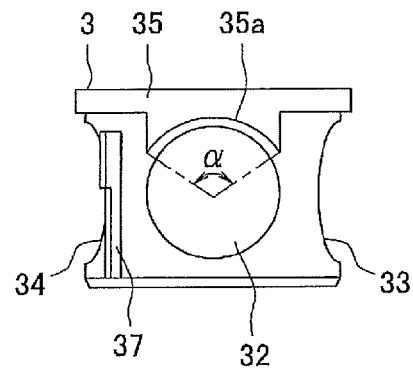
Figure 5:
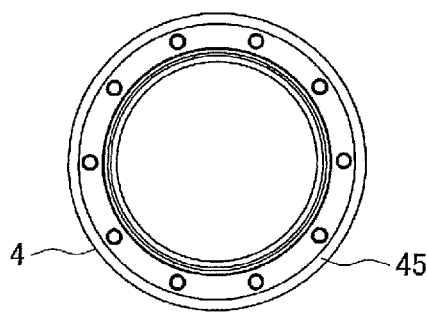
FIG. 5(a) is a plan view.
FIG. 5(b) is a rear view.
FIG. 5(c) is an E-E cross-sectional view.
FIG. 5(d) is an F-F cross-sectional view of a core member.
Figure 5:
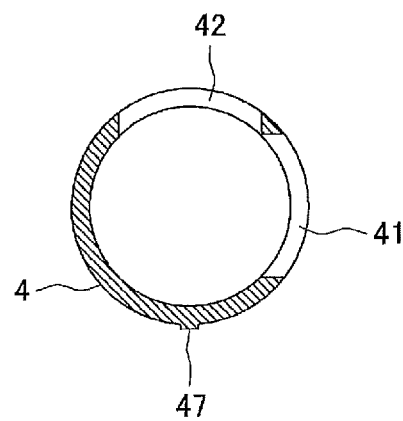
Figure 5:
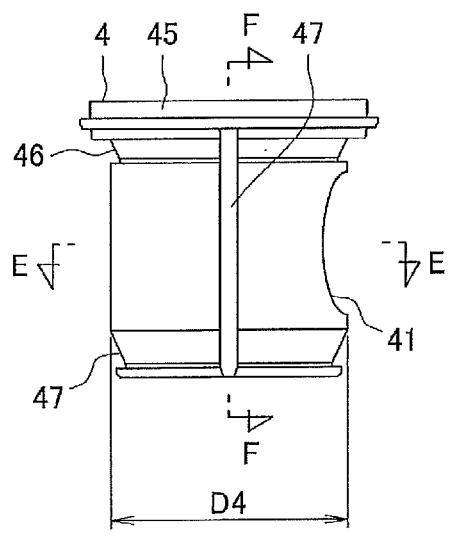
Figure 5:
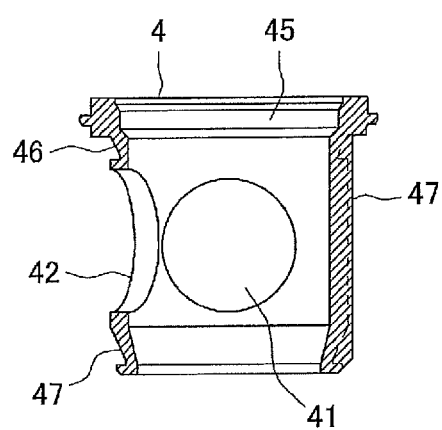
Figure 6:
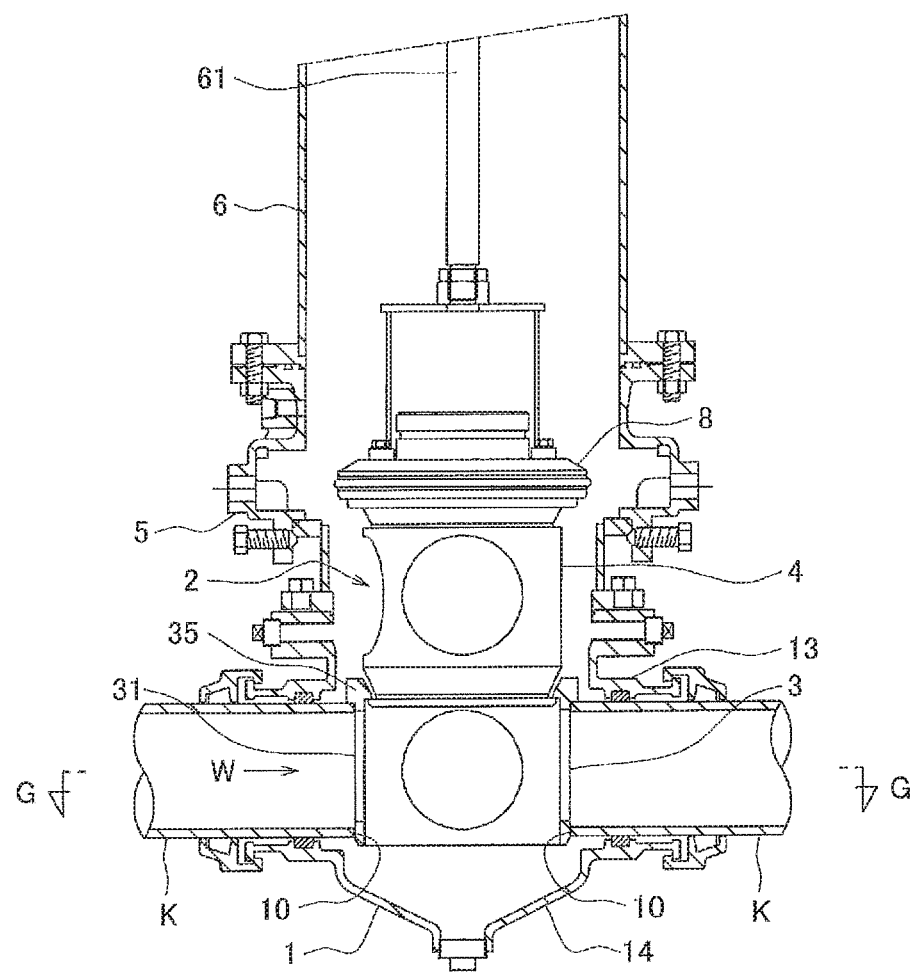
FIG. 6 is a longitudinal cross-sectional front view illustrating a state wherein a double tubular member is disposed between a pair of cut faces of a pipe.
Figure 7:
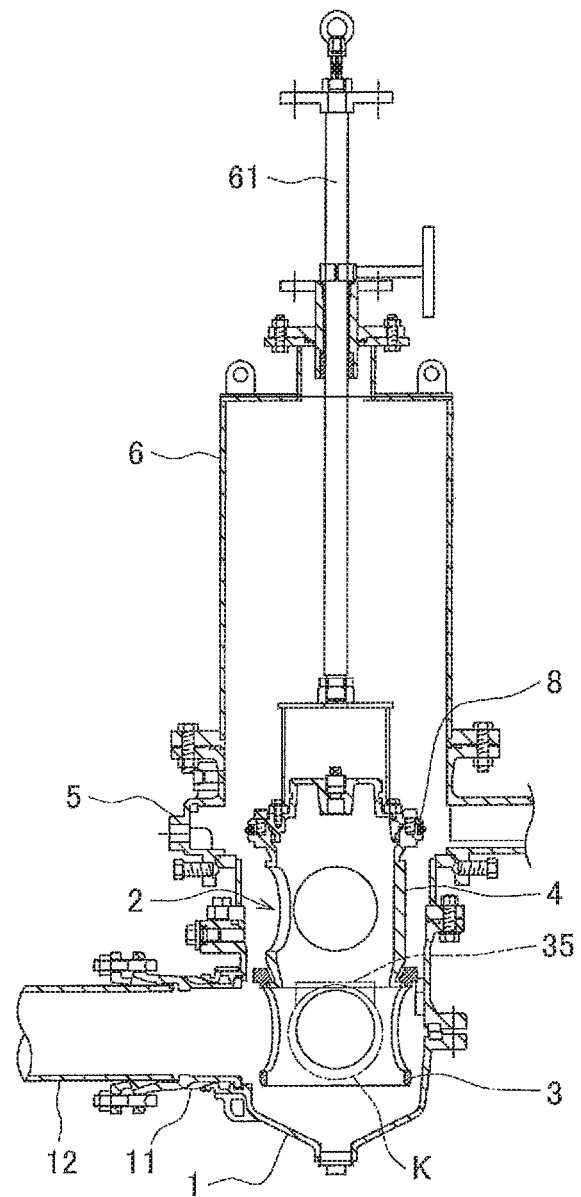
FIG. 7 is a longitudinal cross-sectional side view illustrating a state wherein a double tubular member is disposed between a pair of cut faces of a pipe.
Figure 8:
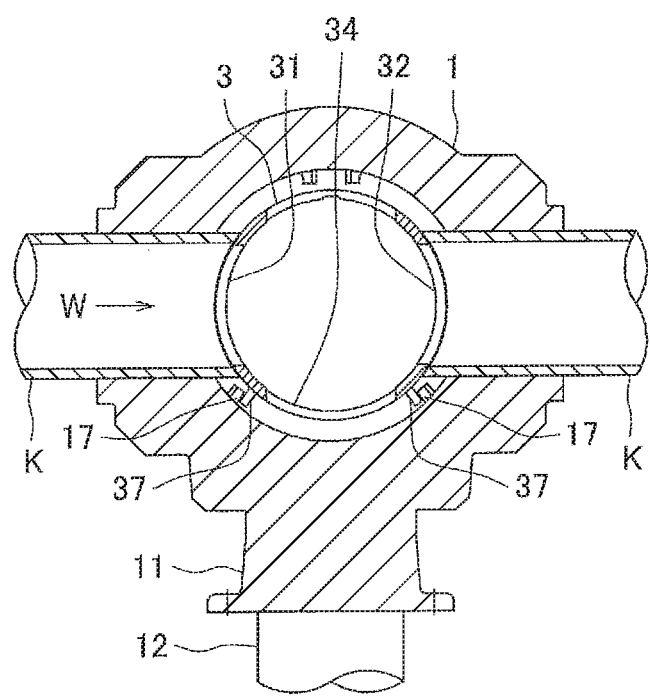
FIG. 8 is a schematic diagram illustrating a G-G cross section of FIG. 6.

The double tubular member 2 is telescopic, including an anti-corrosion member 3 as an outer tube and a core member 4 as an inner tube, the latter being inserted into the former. In FIG. 1 and FIG. 2, the double tubular member 2 is temporarily held, with only a lower portion of the core member 4 being inserted into the anti-corrosion member 3. For convenience of illustration, FIG. 1 shows the anti-corrosion member 3 in a D-D cross section of FIG. 4, while illustrating the outer appearance of the core member 4 and not its cross section. FIG. 4 and FIG. 5 show the anti-corrosion member 3 and the core member 4 alone, respectively. The double tubular member 2 is placed from above between a pair of cut faces 10 formed by making a full cut of the pipe, as shown in FIG. 6 to FIG. 8.

Figure 9:
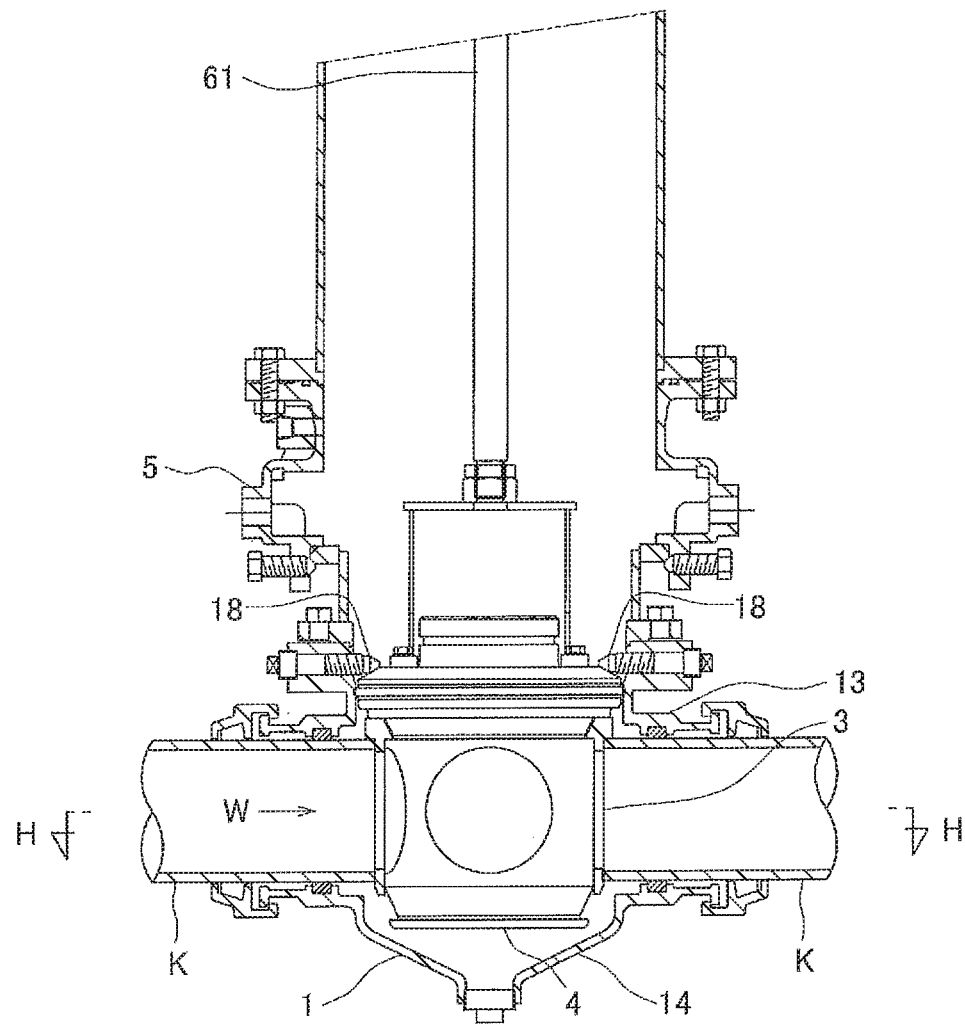
FIG. 9 is a longitudinal cross-sectional front view illustrating a state wherein the anti-corrosion member is pressed against the pair of cut faces of the pipe.
Figure 10:
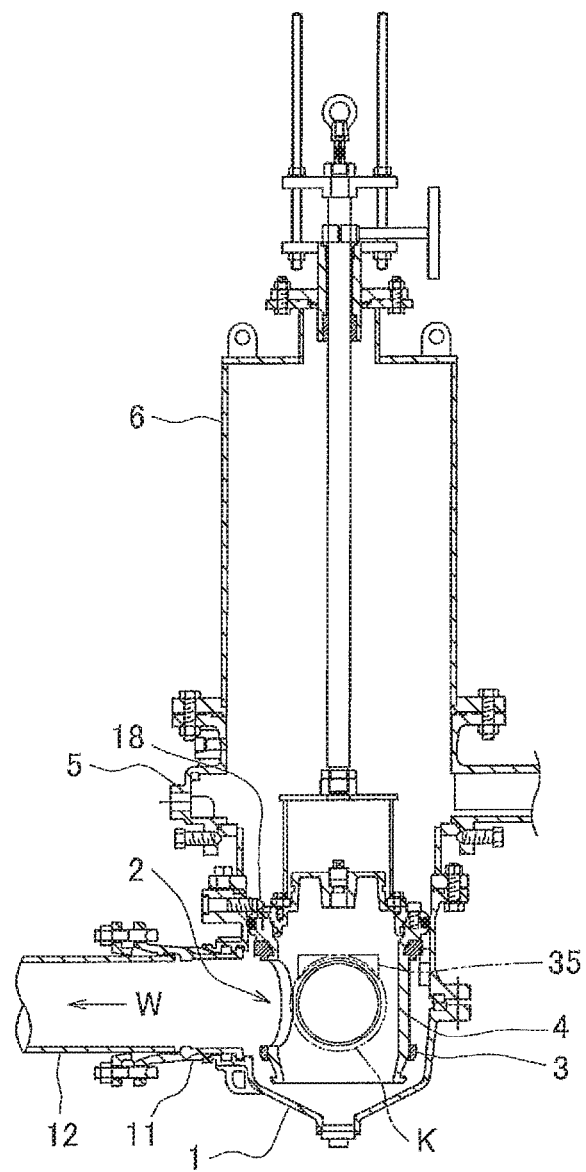
FIG. 10 is a longitudinal cross-sectional side view illustrating a state wherein the anti-corrosion member is pressed against the pair of cut faces of the pipe.
Figure 11:
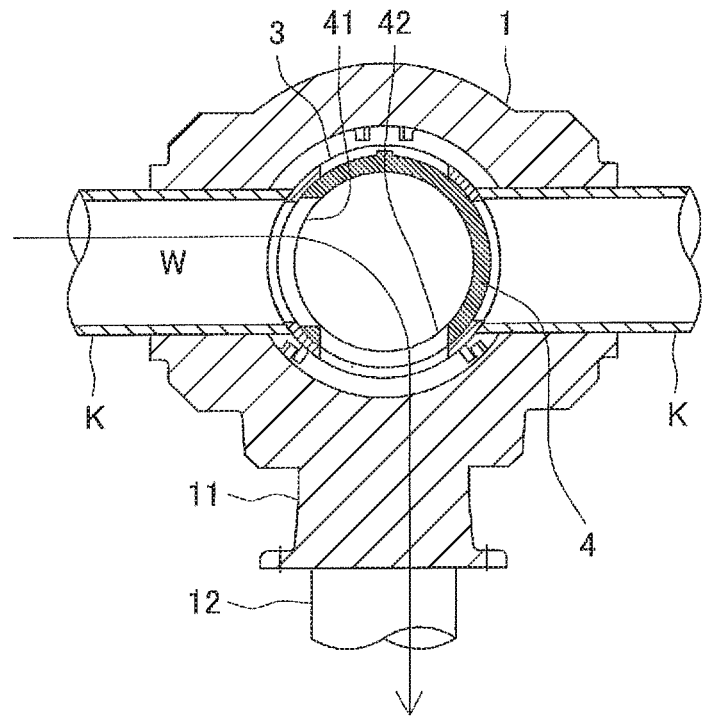
FIG. 11 is a schematic diagram illustrating an H-H cross section of FIG. 9.

With the double tubular member 2 being set between the pair of cut faces 10 of the pipe, the anti-corrosion member 3 faces the pair of cut faces 10 of the pipe. This double tubular member 2 is configured such that the anti-corrosion member 3 is enlarged in diameter by the core member 4 being inserted into the anti-corrosion member 3. FIG. 9 to FIG. 11 show a state wherein the core member 4 has been entirely inserted into the anti-corrosion member 3. The anti-corrosion member 3 is pressed against the pair of cut faces 10 of the pipe and making tight contact therewith. The pair of cut faces 10 formed by making a full cut of the pipe is thus prevented from being exposed and provided with the anti-corrosion treatment.

The anti-corrosion member 3 has a through hole 31 that communicates with the water pipe K, and a flange 35 positioned above the through hole 31 and radially extending outward. The flange 35 extends annularly along the outer periphery of the anti-corrosion member 3, but is not limited to this design. The core member 4 has a through hole 41 that communicates with the water pipe K. In the state shown in FIG. 9 to FIG. 11, the through holes 31 and 41 are substantially coaxial with the water pipe K so that water flows into the double tubular member 2 through the holes. The region surrounding the through hole 31 pressed against the cut face 10 of the pipe is curved along the cut face 10 of the pipe.

As shown in FIG. 4, four through holes 31 to 34 are formed in the sides of the anti-corrosion member 3 (illustration of the through hole 33 is omitted in FIG. 1). The through holes 31 and 32 open in the pipe axis direction of the water pipe K, while the through holes 33 and 34 open in a direction orthogonal to the pipe axis direction of the water pipe K. Similarly to the through hole 31, the surrounding region of the through hole 32 is pressed against the cut face 10 of the pipe. Since water is not passed through the through holes 32 and 33 in this embodiment, these holes need not necessarily be formed. The through hole 34 communicates with the branch pipe 12 for the water to flow out therethrough.

The anti-corrosion member 3 is designed such that, with the core member 4 being inserted in the anti-corrosion member 3 (see FIG. 9), the peripheral edges of the through holes 31 and 32 protrude inward of the cut faces 10 of the pipe all around the cut faces 10 of the pipe. Therefore, the side faces of the anti-corrosion member 3 can be reliably brought into contact with the cut faces 10 of the pipe. In the state before the core member 4 is inserted in the anti-corrosion member 3 (see FIG. 6), the edges need not necessarily protrude completely. While the through holes 33 and 34 are formed with a larger diameter than that of the through holes 31 and 32 in this embodiment for facilitating the anti-corrosion member 3 to radially expand, these holes may be of the same size.

As shown in FIG. 5, a through hole 41 that communicates with the water pipe K, and a through hole 42 that communicates with the branch pipe 12, are formed in the sides of the core member 4. These two through holes 41 and 42 communicate with the through holes 31 and 34 of the anti-corrosion member 3, respectively. No other through holes that communicate with the through holes of the anti-corrosion member 3 are formed in the core member 4. Therefore, the water coming out from the water pipe K flows into the double tubular member 2 through the through holes 31 and 41, and flows into the branch pipe 12 (see FIG. 11) through the through holes 34 and 42. As mentioned above, the through holes 32 and 33 of the anti-corrosion member 3 are not used for water transmission.

The flange 35 of the anti-corrosion member 3 includes an abutment surface 35a that will abut on an outer circumferential surface of the water pipe K, and this abutment surface 35a is curved along the outer circumferential surface of the water pipe K. The characteristic feature of the flange 35 including the abutment surface 35a is indicated with a broken line in FIG. 2 and others. When the double tubular member 2 is set between the pair of cut faces 10 of the pipe as shown in FIG. 6 and FIG. 7, the abutment surface 35a abuts on the outer circumferential surface of the water pipe K from above. Since the abutment surface 35a is curved, the anti-corrosion member 3 is prevented from being installed at a slant. The flange 35 above the cut faces of the pipe 10 is placed firmly, so that the anti-corrosion 3 will not be displaced even when subjected to a load during insertion of the core member 4. Thus, the anti-corrosion treatment can be provided correctly to the cut faces 10 of the pipe.

As shown in FIG. 4, at the point where the anti-corrosion member 3 faces the water pipe K, the thickness of the flange 35 is increased downward, and the curved lower face in this portion forms the abutment surface 35a. With the thickness of the flange 35 made large in the portion where it abuts the outer circumferential surface of the water pipe K in this way, the stability of the flange 35 placed above the cut faces 10 of the pipe is favorably increased. As a result, the flange 35 does not separate from the cut faces 10 of the pipe in the process of transitioning from the state of FIG. 6 and FIG. 7 to the state of FIG. 9 and FIG. 10, and thus the displacement of the anti-corrosion member 3 can be effectively prevented.

As shown in FIG. 4(d), the abutment surface 35a is curved in a circular arc as viewed from the pipe axis direction of the water pipe K, conforming to the fan-shaped circular arc of a circle along this abutment surface 35a with a center angle of α. From the viewpoint of securing a sufficient contact area between the outer circumferential surface of the water pipe K and the abutment surface 35a, the center angle α of this fan shape should preferably be 90° or more, and more preferably 100° or more. If the center angle α is too large, it can sometimes be hard to correct a slight displacement, and therefore the center angle α should preferably be 150° or less, and more preferably 120° or less.

In this embodiment, the anti-corrosion member 3 is formed as an annular cylindrical component that does not have a split portion in the circumferential direction. Therefore, the anti-corrosion member 3 can readily expand in diameter uniformly as the core member 4 is inserted, and is correctly pressed against the cut faces 10 of the pipe. In contrast, with a C-shaped anti-corrosion member that has a split portion in the circumferential direction, the core member may get caught when inserted and cause uneven radial expansion of the anti-corrosion member. The anti-corrosion member 3 should preferably be made of an elastic material such as rubber (e.g., styrene butadiene rubber). The inner diameter D3 of the anti-corrosion member 3 is smaller than the outer diameter D4 of the core member 4, so that the anti-corrosion member 3 will radially expand by the insertion of the core member 4.

The anti-corrosion member 3 is provided with upper engagement portions 36 positioned above the through hole 31 and extending radially inward. While the flange 35 described above is formed on the outer periphery in the upper part of the anti-corrosion member 3, the upper engagement portions 36 are formed on the inner periphery in the upper part of the anti-corrosion member 3. The upper engagement portions 36 of this embodiment have an inclined surface slanted radially inward and downward, which is the direction in which the core member 4 is inserted, as shown in FIG. 4(*b*). The lower part of the anti-corrosion member 3 has no such engagement portions that extend radially inward on the inner periphery and has a straight cylindrical surface. Therefore, the resistance when the core member 4 passes through this section can be made smaller.

A pair of circumferentially spaced guide protrusions 37 are formed on the outer circumferential surface of the anti-corrosion member 3. A pair of circumferentially spaced protrusions 17 are formed on the inner face of the outer case 1. The distance between the protrusions 17 is slightly larger than the distance between the guide protrusions 37. By setting the pair of guide protrusions 37 between the pair of protrusions 17 as shown in FIG. 8, the anti-corrosion member 3 is stopped from rotating relative to the outer case 1 and thus relative displacement between them can be prevented.

The core member 4 comprises an annular cylindrical component without a split portion in the circumferential direction and is made of a metal material such as ductile cast iron, for example. A flange 45 is formed on the outer periphery in the upper part of the core member 4 above the through holes 41 and 42. A radially inwardly recessed upper engagement portion 46 is formed on the outer periphery in the upper part of the core member 4 above the through holes 41 and 42 and below the flange 45. A radially inwardly recessed lower engagement portion 47 is formed on the outer periphery in the lower part of the core member 4 below the through holes 41 and 42. The upper engagement portion 46 and lower engagement portion 47 of this embodiment have an inclined surface that is slanted radially inwardly and downwardly.

As shown in FIG. 1 and FIG. 2, the double tubular member 2 can be temporarily held, with the lower portion of the core member 4 inserted in the anti-corrosion member 3, by fitting the upper engagement portions 36 of the anti-corrosion member 3 with the lower engagement portion 47 of the core member 4. Since the anti-corrosion member 3 does not drop but is kept suspended from the core member 4, the double tubular member 2 is made easy to handle, and thus workability can be significantly improved. As will be described later, with the double tubular member 2 being temporarily held, the core member 4 is pushed in while the anti-corrosion member 3 is kept in position, so that the core member 4 is inserted into the anti-corrosion member 3 for the latter to expand in diameter. The upper engagement portions 36 of the radially expanded anti-corrosion member 3 fit with the upper engagement portion 46 of the core member 4.

As shown in FIG. 4(*a*), the upper engagement portions 36 of the anti-corrosion member 3 extend along the circumferential direction, with notches 38 formed at a plurality of circumferential locations (four in this embodiment). These notches 38 can reduce the resistance when the core member 4 is inserted into the anti-corrosion member 3, in particular, the resistance when the core member 4 is pushed in further from the temporarily held state. As a result, the core member 4 is inserted smoothly, allowing the anti-corrosion member 3 to smoothly expand radially and to be correctly pressed against the cut faces 10 of the pipe.

The notches 38 facing the water pipe K have a smaller length than that of the notches elsewhere. Namely, the notches 38*a* positioned opposite the water pipe K are shorter than the notches 38*b* formed elsewhere. This way, a reduction in the thickness of the anti-corrosion member 3 in the portion where the abutment surface 35*a* is provided is minimized, so that the stability of the flange 35 placed on the cut faces 10 of the pipe is increased. If the notches 38*a* are not provided and notches 38 are formed only at positions not opposite the water pipe K, the advantageous effects described above are further enhanced.

As shown in FIG. 4, a groove 39 extending along the insertion direction of the core member 4 is formed in the inner circumferential surface of the anti-corrosion member 3. A projection 47 that fits in this groove 39 is formed in the outer circumferential surface of the core member 4 as shown in FIG. 5. Therefore, the anti-corrosion member 3 is stopped from rotating relative to the core member 4, and thus relative displacement between the anti-corrosion member 3 and the core member 4 can be prevented. This structure is also useful for making the through holes 31 and 41 to correctly coincide with each other, and the through holes 34 and 42 to correctly coincide with each other, when the core member 4 is entirely inserted into the anti-corrosion member 3.

The anti-corrosion treatment is provided to the cut faces 10 of the pipe in the following manner: First, the sealed case 6 that accommodates therein the double tubular member 2 in the temporarily held state is connected to the work valve 5 as shown in FIG. 2. The upper part of the core member 4 is shut with a middle plug 8, and a sealing member for sealing the opening in the upper part of the upper member 13 is mounted between the flange 45 of the core member 4 and the middle plug 8. The middle plug 8 is secured to the core member 4 with bolts, and supported by an operation lever 61. The double tubular member 2 is lifted and lowered by operating the operation lever 61.

Next, the work valve 5 is opened, and the operation lever 61 is pushed down, so as to lower the double tubular member 2 to be closer to the water pipe K as shown in FIG. 1. When the double tubular member 2 is further lowered, the double tubular member 2 comes to position between the pair of cut faces 10 of the pipe as shown in FIG. 6 and FIG. 7. The flange 35 sits above the cut faces 10 of the pipe at this time, with its abutment surface 35*a* contacting the outer circumferential surface of the water pipe K, so that the anti-corrosion member 3 does not go further down and is fixed there. Since the abutment surface 35*a* is curved, the anti-corrosion member 3 is prevented from being placed at a slant. The guide protrusions 37 of the anti-corrosion member 3 are positioned between the pair of protrusions 17 formed to the outer case 1.

Then, the operation lever 61 is further pushed down to push in the core member 4 while the anti-corrosion member 3 is fixed, so that the core member 4 is inserted into the anti-corrosion member 3 set to face the pair of cut faces 10 of the pipe as shown in FIG. 9 and FIG. 10. This causes the radially expanded anti-corrosion member 3 to abut on the pair of cut faces 10 of the pipe and thus the anti-corrosion treatment is provided to the cut faces 10 of the pipe. The through holes 31 and 41 communicate with the water pipe K, while the through holes 34 and 42 communicate with the branch pipe 12, so that the flow path is changed via the double tubular member 2 as shown in FIG. 11. The operation that needs to be performed in the transition from the state of FIG. 2 to reach the state of FIG. 9 and FIG. 10 is only the opening of the work valve 5 and the pressing down of the operation lever 61.

In this embodiment, through holes 32 and 33 that do not communicate with the through holes in the core member 4 are formed in the anti-corrosion member 3, i.e., the anti-corrosion member 3 has a larger number of through holes in the sides than the through holes in the sides of the core member 4. Although these through holes 32 and 33 are not used for water transmission, these holes facilitate the anti-corrosion member 3 to radially expand, which makes it easier to press the anti-corrosion member 3 correctly on the cut faces 10 of the pipe.

In the process of inserting the core member 4 into the anti-corrosion member 3, the flange 35 sitting above the cut faces 10 of the pipe is subjected to a load. If the flange 35 is not stable, the anti-corrosion member 3 may come off of the water pipe K and drop and end up being displaced from the cut faces 10 of the pipe. With this corrosion prevention apparatus, the abutment surface 35*a* is curved along the outer circumferential surface of the water pipe K and the flange 35 above the cut faces 10 of the pipe is placed firmly, so that such displacement of the anti-corrosion member 3 is prevented. As a result, a correct anti-corrosion treatment can be provided to the cut faces 10 of the pipe.

Figure 12:
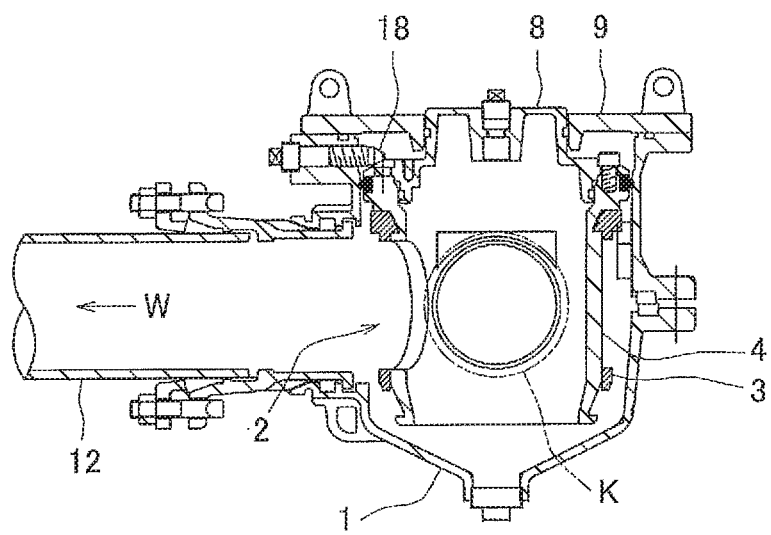
FIG. 12 is a longitudinal cross-sectional side view illustrating a state when operation has been completed.

After the anti-corrosion member 3 has been expanded radially to provide the anti-corrosion treatment, fixing bolts 18 are advanced inward of the outer case 1, which will press down the middle plug 8 from above to secure the double tubular member 2. The work valve 5 and the sealed case 6 are then removed from the outer case 1, and a lid 9 is attached instead to seal the outer case 1 accommodating the double tubular member 2 as shown in FIG. 12.

The present invention is not limited to the embodiment described above in any way and various improvements and changes can be made without departing from the scope of the subject matter of the present invention.

While the double tubular member is used only for changing the flow path in the embodiment described above, the invention is not limited to this. For example, the double tubular member may be used for shutting or switching the flow path. In this case, a core member accommodating a partitioning member maybe used. This partitioning member can close the through hole so as to shut the flow path. Alternatively, the core member may be formed with three or more through holes, and these through holes may be selectively closed with the partitioning member, so as to switch the flow path. Various types of partitioning members such as rotary type or fixed type maybe employed. Such a double tubular member would be used as a valve device.

The present invention is applicable, but not limited, to water pipes, and can be widely applied to fluid pipes used for fluids other than water such as various liquids and gasses.

DESCRIPTION OF REFERENCE SIGNS

1 Outer case
2 Double tubular member
3 Anti-corrosion member
4 Core member
10 Cut faces of pipe
12 Branch pipe
31 Through hole
32 Through hole
33 Through hole
34 Through hole
35 Flange
35*a* Abutment surface
36 Upper engagement portion
41 Through hole
42 Through hole
47 Lower engagement portion
K Water pipe (example of a fluid pipe)

What is claimed is:

1. A corrosion prevention apparatus for cut faces of pipes, comprising:
    a telescopic double tubular member accommodated in an outer case that is mounted such as to surround an outer circumferential surface of a fluid pipe, and placed from above between a pair of cut faces formed by making a full cut of the fluid pipe,
    the double tubular member including an anti-corrosion member that faces the pair of cut faces of the pipe and a core member to be inserted into the anti-corrosion member from above, and the double tubular member being configured such that the anti-corrosion member expands radially by the core member being inserted into the anti-corrosion member, so as to be pressed against the pair of cut faces of the pipe,
    the anti-corrosion member having a through hole that communicates with the fluid pipe, and a flange positioned above the through hole and extending radially outward, and
    the flange having an abutment surface that abuts on an outer circumferential surface of the fluid pipe, the abutment surface being curved along the outer circumferential surface of the fluid pipe.

2. The corrosion prevention apparatus for cut faces of pipes according to claim 1, wherein the anti-corrosion member comprises an annular cylindrical member that does not have a split portion in a circumferential direction.

3. The corrosion prevention apparatus for cut faces of pipes according to claim 1, wherein the anti-corrosion member has an upper engagement portion positioned above the through hole and extending radially inward, while the core member has a radially inwardly recessed lower engagement portion on an outer periphery in a lower part thereof,
    the double tubular member being able to be held temporarily with a lower part of the core member inserted in the anti-corrosion member by fitting the upper engagement portion of the anti-corrosion member with the lower engagement portion of the core member, and
    the upper engagement portion of the anti-corrosion member extending in a circumferential direction, with notches formed at a plurality of positions in the circumferential direction.

4. The corrosion prevention apparatus for cut faces of pipes according to claim 3, wherein the notches are shorter at positions opposite the fluid pipe than elsewhere, or, the notches are only formed at positions not opposite the fluid pipe.

5. The corrosion prevention apparatus for cut faces of pipes according to claim 1, wherein the anti-corrosion member has a larger number of through holes in sides than that of through holes formed in sides of the core member.

6. A corrosion prevention method for cut faces of pipes, comprising:

placing the double tubular member from above between a pair of cut faces formed by making a full cut of the fluid pipe, with the use of the corrosion prevention apparatus for cut faces of pipes according to claim 1;

bringing an abutment surface of the flange into contact with an outer circumferential surface of the fluid pipe from above;

inserting the core member into the anti-corrosion member that is positioned opposite the pair of cut faces of the pipe; and pressing the anti-corrosion member that has been radially expanded by insertion of the core member against the pair of cut faces of the pipe.

* * * * *